United States Patent [19]

Witt

[11] 3,875,079

[45] Apr. 1, 1975

[54] LARGE PORE SILICAS

[75] Inventor: Donald R. Witt, Bartlesville, Okla.

[73] Assignee: Phillips Petroleum, Bartlesville, Okla.

[22] Filed: July 31, 1972

[21] Appl. No.: 276,373

[52] U.S. Cl. ................................ 252/451, 252/458
[51] Int. Cl. ....................... B01j 11/36, B01j 11/06
[58] Field of Search ........................... 252/451, 458

[56] References Cited
UNITED STATES PATENTS 3,622,521 11/1971 Hogan et al. .................. 252/458 X
3,696,053 10/1972 Le Page et al. ................. 252/451 X Primary Examiner—C. Dees

[57] ABSTRACT

Olefin polymerization catalysts, formed of a silica produced employing lithium silicate, produce ethylene polymers of higher melt index than are obtained when sodium silicate is employed.

12 Claims, No Drawings

LARGE PORE SILICAS

This invention pertains to large pore silicas.

In one of its more specific aspects, this invention pertains to the preparation of silicas which can be used as supports for chromium-containing catalysts in olefin polymer production.

Methods for the polymerization of olefins, particularly ethylene and propylene, contained in olefin-containing streams, employing chromium-containing catalysts are known from U.S. Pat. No. 2,825,721 and Canadian Pat. No. 853,414, both of which disclosures are incorporated herein by reference. The silicas employed in such catalysts can be produced by introducing an aqueous solution of an alkali metal silicate into an aqueous solution of an acid, aging the hydrogel which forms, separating the water from the hydrogel to form a xerogel and using the xerogel comprising silica as the chromium oxide support. The method of the present invention is related to this procedure in that lithium silicate is employed as the alkali metal silicate. As a result, there is produced a chromium-containing catalyst by which polymers having a higher melt index are produced.

The method of this invention employs lithium silicate in combination with the above procedures. In general, the lithium silicate solution is introduced into the aqueous acid solution, preferably at a controlled rate, either of the solutions, optionally, containing a titanium and/or a chromium compound. The introduction can be made constantly or intermittently such that during the total period during which the addition is made, from about 0.1 to about 15 weight percent of the total weight of the silica is added per minute.

The hydrogel is then aged at a temperature of from about 70° to 90°C for a period greater than one hour after which it is washed with water or an aqueous solution containing ammonium nitrate to reduce its alkali metal content to less than about 0.1 weight percent.

After washing, the hydrogel is contacted with a normally liquid, oxygen-containing organic compound which is soluble in water. The hydrogel can be washed repeatedly with the organic compound or azeotropic distillation of the organic compound-water mixture can be employed to separate the water from the hydrogel and to form a substantially water-free xerogel. The xerogel is then impregnated with an anhydrous chromium-containing compound and heat activated to produce a catalyst active in olefin polymerization.

At any point in the foregoing procedure, chromium, titanium or other adjuvants can be incorporated in the hydrogel or xerogel. Preferably, a titanium-containing compound will be contained in the aqueous acid solution into which the aqueous lithium silicate solution is introduced.

In the method of the present invention, the procedure defined above is carried out employing lithium silicate as the alkali metal silicate.

Lithium silicate is used in the form of a silicate solution containing, as normally expressed, at least 0.5 weight percent lithium monoxide.

To illustrate the best mode of practicing this invention, a series of hydrogels were prepared under substantially identical conditions employing a sodium silicate solution and lithium silicate solutions.

As described above, all gels were prepared by introducing the silicate solution into sulfuric acid solution, aging the hydrogel which formed at 80°–90°C for about 4 hours, washing the aged hydrogel with aqueous ammonium nitrate solution containing 0.5 weight percent $NH_4NO_3$ and then with deionized water or distilled water and separating the water from the hydrogel employing ethyl acetate and azeotropic distillation. The xerogel was recovered and was impregnated with a hydrocarbon solution of t-butyl chromate to produce silicas containing about 1 weight percent chromium. The chromium-impregnated silicas were then activated at about 1,600°F in air and the resulting catalysts were employed in ethylene polymerization.

Results were as follows:

| Composition of the Silicate Solution, Wt. % | | | Reactants | | Gel Wt. % $SiO_2$ | Polymer melt Index |
|---|---|---|---|---|---|---|
| $Na_2O$ | $Li_2O$ | $SiO_2$ | Silicate gms | $H_2SO_4$, gms | | |
| 8.9 | 0 | 28.7 | 183 | 27 | 8.2 | 3.6 |
| 0 | 1.6 | 18.8 | 400 | 17.4 | 8.2 | 5.0 |
| 0 | 1.6 | 18.8 | 400 | 17.4 | 8.4 | 5.7 |
| 0 | 2.2 | 20.7 | 246 | 19 | 7.8 | 4.0 |
| 0 | 2.2 | 20.7 | 300 | 19 | 7.8 | 4.7 |

While the relative amounts of $SiO_2$ and alkali metal monoxide in the silicate solutions varied somewhat, the amounts of $SiO_2$ in the gels of runs 1 and 2 of the table were comparable and the others were similar. In view of this, the above data indicate that the employment of lithium silicate does result in the production of a silica which, when employed as a component of an olefin polymerization catalyst, is effective in producing olefin polymers of higher melt index.

It will be evident from the foregoing that various modifications can be made to the method of this invention. Such are considered, however, to be within the scope of the invention.

What is claimed is:

1. A method of preparing a silica-containing composition which comprises:
   a. introducing an aqueous lithium silicate solution into an aqueous acid solution to form a hydrogel and a solution containing at least about 1.6 weight percent lithium monoxide;
   b. aging the hydrogel;
   c. washing the hydrogel to reduce the alkali metal content of the hydrogel;
   d. contacting the hydrogel with a normally liquid, oxygen-containing, water soluble, azeotropic mixture-forming organic compound to separate water from said hydrogel and to form a xerogel; and,
   e. recovering the xerogel as the silica-containing composition.

2. The method of claim 1 in which said aqueous lithium silicate solution comprises at least 0.5 weight percent lithium monoxide.

3. The method of claim 1 in which said aqueous lithium silicate solution contains a titanium-containing compound.

4. The method of claim 1 in which said aqueous lithium silicate is introduced into said acid solution at a rate of addition of from about 0.1 to about 15 weight percent of the total quantity of the lithium silicate added per minute.

5. The method of claim 4 in which said hydrogel is aged at a temperature within the range of from about 70° to 90°C for a period greater than one hour.

6. The method of claim 5 in which the aged hydrogel is contacted ethyl acetate to form a mixture and said mixture is azeotropically distilled form said xerogel.

7. The method of claim 6 in which said xerogel is impregnated with t-butyl chromate to produce a silica containing about 1 weight percent chromium and the chromium-containing silica is activated to produce a catalyst active in ethylene polymerization.

8. The method of claim 1 in which a titanium-containing compound is contained in said aqueous acid solution.

9. The method of claim 7 in which said silica-containing composition is a silica gel and said oxygen-containing water-soluble organic compound is ethylacetate.

10. The method of claim 7 in which said silicate solution contains about 2.2 weight percent lithium monoxide.

11. The method of claim 7 in which said silicate solution contains about 21 weight percent silicon dioxide.

12. The method of claim 1 in which said xerogel is impregnated with a chromium-containing compound and activated to produce a catalyst active in olefin polymerization.

* * * * *